United States Patent Office 2,708,969
Patented May 24, 1955

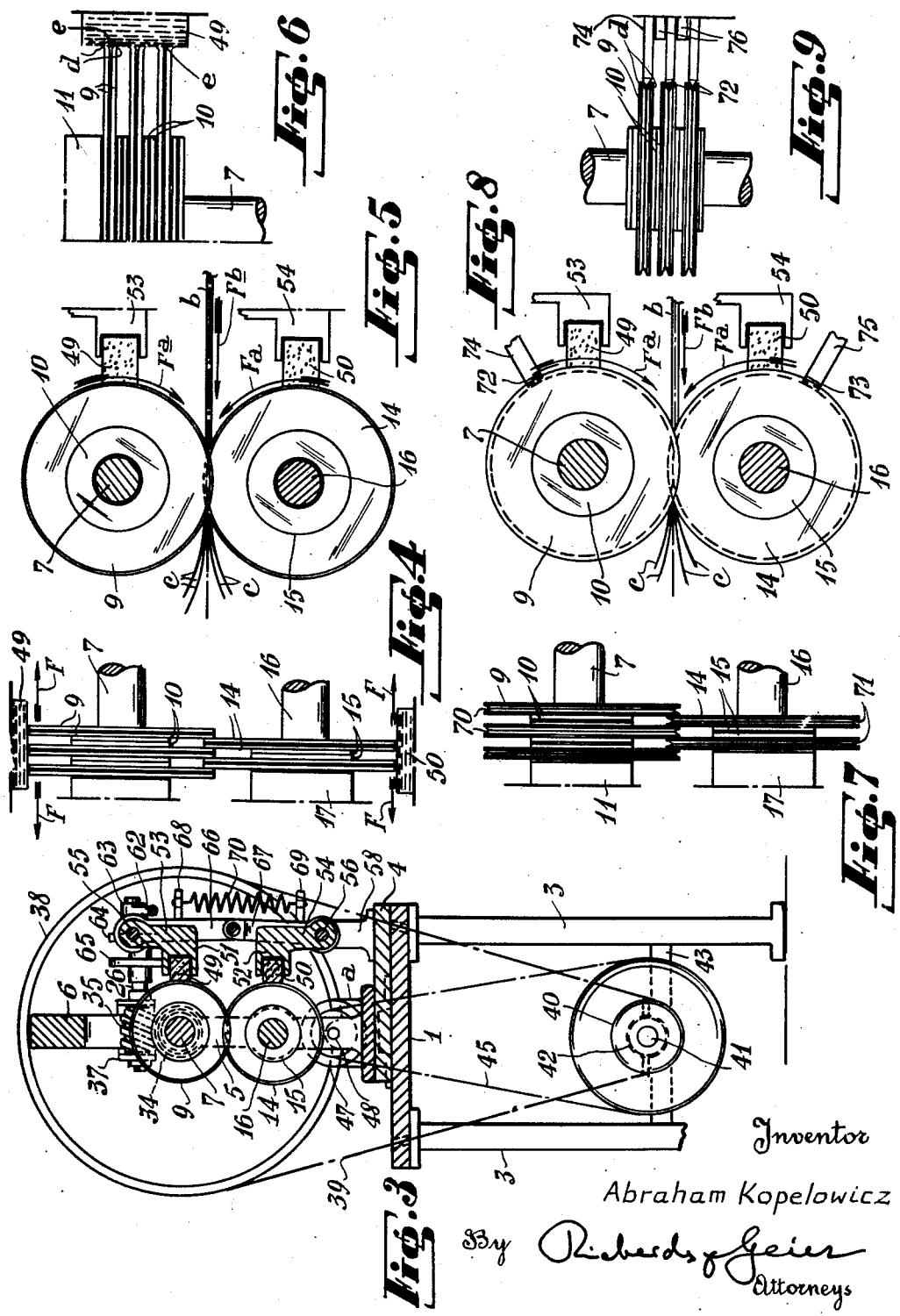

2,708,969
RUBBER THREAD CUTTING MACHINES

Abraham Kopelowicz, Buenos Aires, Argentina

Application December 22, 1950, Serial No. 202,181

3 Claims. (Cl. 164—60)

This invention refers to a rubber thread cutting machine in which the rubber threads are obtained by dividing a rubber sheet into a plurality of individual filaments or threads, the cutting operation being a continuous process.

One of the known types of rubber thread cutting machines comprises a plurality of cutting discs separated by washers of smaller diameter and arranged on two cooperating rotary shafts which are mounted in such a manner that the projecting cutting borders of the cutting discs of one shaft penetrate into the spaces formed between the projecting cutting borders of the cutting discs mounted on the other rotary shaft. In view of the fact that the separator washers are designed to have a thickness equal to that of the cutting discs, the cutting borders of the cutting discs of both shafts are in continuous frictional engagement and the cooperating lateral borders of two opposite discs constitute the cutting zone in which the rubber sheet is provided with a longitudinal incision. However, in view of the nature of the material which is to be transformed into threads or filaments, the cutting borders of the cutting discs are subject to an intensive wear, so that the intimate contact between the cutting borders of the cutting discs, which is necessary if it is desired to obtained cleanly cut filaments or threads, is lost and the cutting action of the cutting discs is transformed into a tearing action which cannot produce threads of acceptable appearance and structure.

Consequently, in order to obtain a satisfactory operation of the thread cutting machine of the type described hereinbefore, it would be necessary to adjust rather frequently the separation between the cutting discs and it will be understood that such adjustments, apart from being rather complicated, interrupt the manufacturing process and thus increase the cost of the final product.

The improved rubber thread cutting machine according to the present invention is characterized by the fact that the cutting discs are mounted in permanent frictional contact with means capable of forming, on each border of the cutting discs, a fin or burr which compensates for the wear of the lateral border surfaces of the cutting discs, and makes it possible to maintain the cutting discs in perfect frictional contact thus facilitating the cutting operation of the machine.

One of the main objects of the present invention consists in providing a rubber thread cutting machine in which the cutting edges of the cutting discs are reshaped to remain in close frictional contact one with the other.

Other objects and advantages of the present invention will become apparent from the following detailed description taken in conjunction with the accompanying drawings which illustrate one of the preferred embodiments of the improved rubber thread cutting machine and wherein:

Fig. 3 is a cross-section taken along line A—A in Fig. 2.

Fig. 4 is a partial view showing the cutting elements on a larger scale.

Fig. 5 is a frontal view of the cutting means illustrated in Fig. 4.

Fig. 6 is a partial view of the cutting members in their position of cooperation with the means for compensating for the wear of the cutting edges.

Fig. 7 is a partial view of another embodiment of the cutting means used in the machine according to the present invention.

Fig. 8 is a front view of the elements shown in Fig. 7 and finally,

Fig. 9 is a partial view of a group of cutting members of the type shown in Fig. 8 in their position of cooperation with means for compensating the wear of the cutting edges.

In the figures, the same reference numerals and letters designate the same of similar parts or elements.

Figure 1:
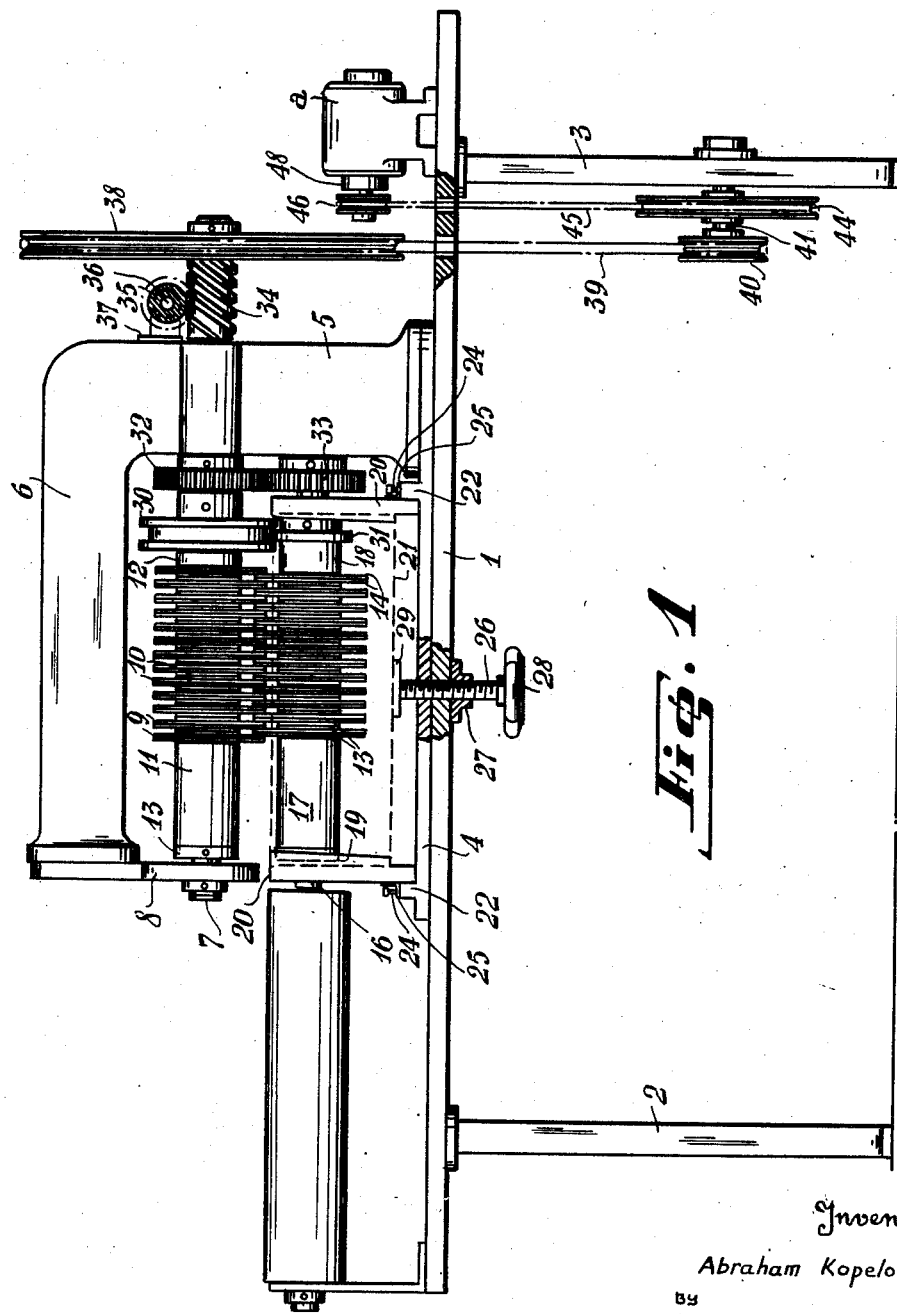
Fig. 1 is a front view of the improved rubber thread cutting machine.

The improved rubber thread cutting machine comprises a frame provided with a table 1 and supports 2 and 3. On table 1 there is mounted a plate 4 one of the extremes of which bears the vertical arm 5 of a frame member 6 which supports the movable parts of the machine which are constituted by a shaft 7 journalled with one of its ends in vertical arm 5, while the opposite end thereof is journalled in a guide plate 8 fixed to the end of frame member 6. On shaft 7 there is mounted a plurality of cutting discs 9 which are separated by means of separator washers 10, each of these discs 9 being constituted by two disc-shaped members. Cutting discs 9 and separator washers 10 are clamped on shaft 7 by means of bushings 11 and 12 and a washer 13 fixed to the end of shaft 7 and abutting against bushing 11. Washer 13 and both bushings 11 and 12 are of an elastic material such as compressed rubber, and thus make possible slight lateral movements of cutting discs 9 and of separator washers 10 during the cutting operation of the rubber threads.

Cutting discs 9, arranged on shaft 7, cooperate with a second set of cutting discs 14, each of which is also constituted by two adjacent disc members and separated by means of separator washers 15 arranged on a rotary shaft 16 mounted below shaft 7. Cutting discs 14 and separator washers 15 are held together on shaft 15 by means of bushings 17 and 18 and washer 19, which are similar in structure and form to the bushings and washers used on rotary shaft 7. Shaft 16 is journalled at both ends in the lateral arms 20 of a support and guiding member 21 which is detachably mounted on plate 4 on the inner face of two projecting borders 22. The position of rotary shaft 16 with respect to shaft 7 can be adjusted in order to control the penetration of the set of cutting discs mounted thereon between the cutting discs 9 of shaft 7, and for this purpose the horizontal portion of guiding member 21 is in contact with a lifting screw 26 which passes through plate 4 and frame 1 and cooperates with a nut 27 fixed to frame 1. The lower end of screw 26 is provided with a handle 28 and the upper end abuts against a reinforcing plate 29 fixed to the horizontal portion of guiding member 21, the vertical movements of which are guided by means of studs 24 which pass through the horizontal arms of two L members 25 the vertical arms of which are fixed to the external surfaces of lateral arms 20 of guiding member 21.

Upper rotary shaft 7 carries a wheel member 30 fixed rigidly to shaft 7 and provided with a peripheral recess into which penetrates the outer border of a wheel member 31 fixed rigidly to rotary shaft 16, and both wheel members 30 and 31 cooperate to avoid axial displacements of shafts 7 and 16 which would detrimentally affect the cutting operation of cutting discs 9 and 14 mounted thereon.

Both shafts 7 and 16 are coupled by means of gear wheels 32 and 33, so that both shafts rotate in synchronism. Shaft 7 is provided with an extension passing through vertical arm 5 which carries a worm gear 34 which cooperates with a driving gear wheel 35 arranged on a shaft 36 journalled in a support 37 fixed to the lateral surface of vertical arm 5. The same end of rotary shaft 7 is coupled to a motor $a$, arranged on the frame 1, by means of two sets of velocity reducing pulleys 38, 40 and 44, 46 with the corresponding belts 39 and 45. Pulleys 40 and 44, are mounted on a shaft supported by member 3 of frame 1, while pulley 46 is mounted on rotary shaft 48 of motor $a$.

Figure 2:
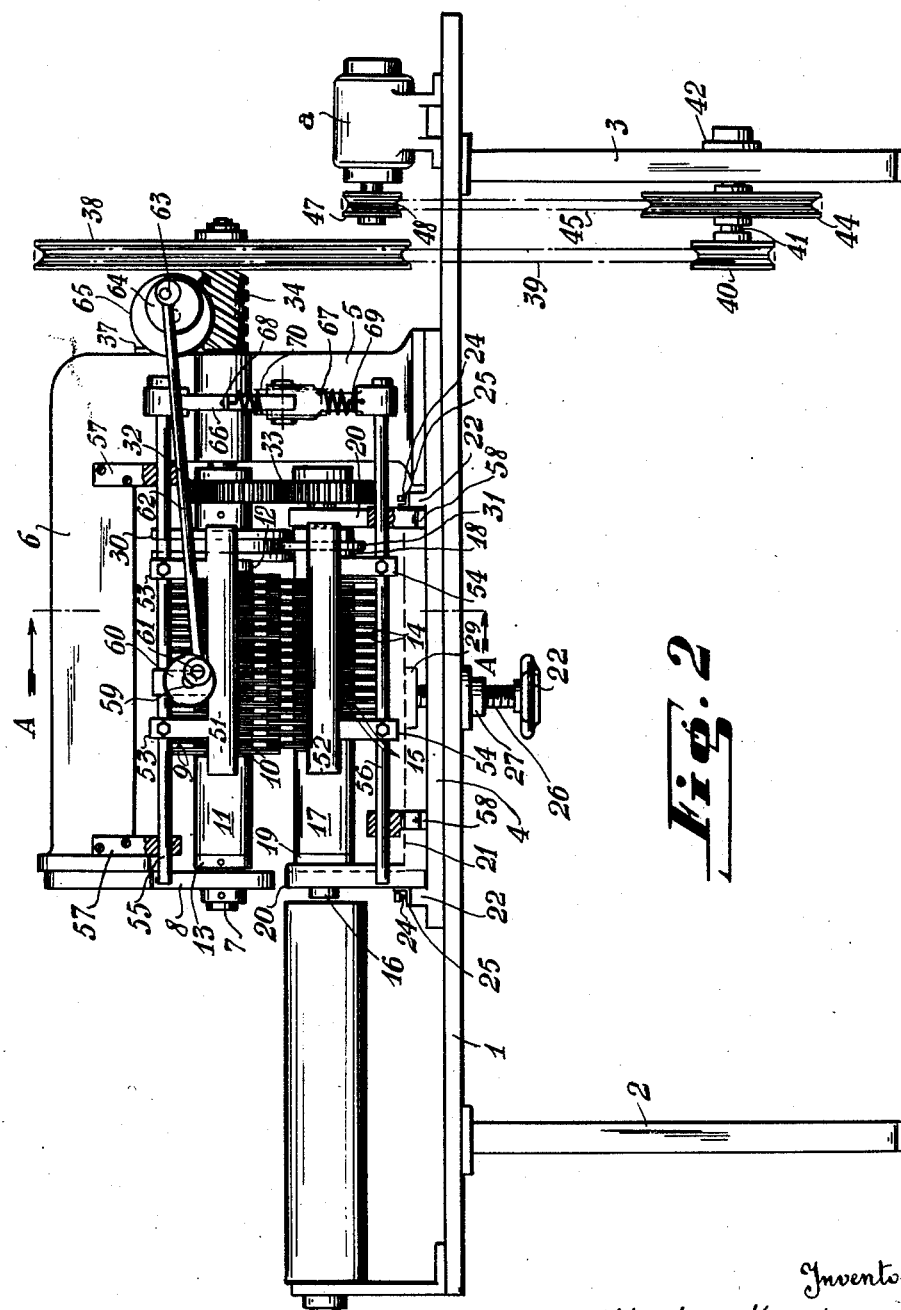
Fig. 2 is another front view of the same machine showing the means for compensating for the wear of the cutting discs.

The means for compensating for the wear of the cutting discs 9 and 14 of the rubber thread cutting machine according to the invention are constituted by two plates 49 and 50 of abrasive material, of which plate 49 is arranged in frictional contact with the peripheral borders of cutting discs 9 mounted on the upper shaft 7, while abrasive plate 50 is arranged in frictional contact with the peripheral borders of cutting discs 14 arranged on lower rotary shaft 16, both plates 49 and 50 being detachably mounted in respective holders 51 and 52 as can be observed in Figs. 2 and 3. These holders 51 and 52 are provided with perpendicularly arranged arms 53 and 54, respectively, the ends of which are fixed to rods 55 and 56 mounted with a reciprocating movement in the respective guides 57 and 58, the former being arranged on frame 6 while the latter are mounted on plate 4.

On holder 51 there is provided a shaft 59 on which there is arranged a cam 60 carrying one end 61 of a coupling rod 62 the other end of which is journalled on a cam 64 forming part of a disc 65 which is arranged on the shaft 36 carrying the worm gear 35, so that a relatively slow reciprocating movement is imparted to holder 51 during the rotation of worm gear 35.

Reciprocating rod 55, on which there is arranged holder 51, is coupled to rod 56, on which there is mounted holder 52, by means of a lever 66 the lower end of which is pivoted in the U-shaped upper end of a second lever 67, the lower end of which is fixed to rod 56, so that the reciprocating movement of rod 55 is transmitted to rod 56, and hence also to holder 52 and abrasive plate 50. Consequently, during the cutting operation of the machine, abrasive plates 49 and 50 describe a reciprocating movement while remaining in contact with the peripheral borders of rotary cutting discs 9 and 14 (arrows F in Fig. 4) thus continuously sharpening the peripheral surfaces of the cutting discs 9 and 14 and maintaining the same in perfect operating conditions.

The outer ends of levers 66 and 67 carry arms 68 and 69 respectively, to which are fixed the ends of an expansion spring 70, capable of compensating the oscillatory movements of said levers 66 and 67 and thus pressing continuously, holders 51 and 52 with abrasive plates 49 and 50 against the peripheral borders of cutting discs 9 and 14.

As can be observed in Fig. 6, which shows schematically cutting discs 9 in relation to abrasive plate 49, each of the outer edges of these discs carries a burr $e$ due to the sharpening action of abrasive plate 49, and since these cutting discs are constituted by two adjacent elements, the burrs which form on the inner edges of these elements cause a certain widening of the cutting border of each of these discs 9, considered as a whole. The respective widened portions are designated with $d$ in Fig. 6. The peripheral portions of cutting discs 14 show a similar widening due to the continuous sharpening action of abrasive plate 50, so that both series of cutting discs are always in perfect frictional contact at their peripheries, thus ensuring a satisfactory cutting action of the machine. On the other hand, it will be understood that abrasive plates 49 and 50, besides providing a widening of the peripheral portion of the cutting discs 9 and 14 of the machine according to the invention, also sharpen the outer borders of these widened discs.

With respect to Figs. 7 and 9 showing a modification of the improved rubber thread cutting machine according to the present invention, it will be observed that in this machine the cutting discs 9 and 14, instead of being constituted by a pair of adjacent disc elements, are each formed by an integral disc the peripheral surface of which carries a circular groove bearing reference numeral 70 in cutting discs 9 and 71 in cutting discs 14. A plurality of circular wedges 74 and 75 are arranged in two rows each corresponding to one of the rows of cutting discs 9 and 14, and the pointed borders 72 and 73 of these wedges 74 and 75, respectively, penetrate into grooves 70 and 71 respectively of cutting discs 9 and 14. Wedges 74 and 75 are formed of discoidal members having a thickness substantially equal to that of cutting discs 9 and 14 and are mounted on a shaft, not shown in the drawings, with the use of separator washers 76, as can be observed in Fig. 9. The shaft on which wedges 74 and 75 are mounted is arranged with free rotary movement in frame 6. In the embodiment of the cutting machine described with reference to Figs. 7 to 9, wedges 74 and 75 are mounted to exercise a predetermined pressure against cutting discs 9 and 14 and cause a marginal widening of the cutting discs, thus providing the expansion $d$ in cooperation with abrasive plates 49 and 50, as can be observed in Fig. 8.

It should be understood that files can be substituted for the abrasive plates shown in the drawings.

It will also be appreciated that modifications of the disclosed embodiments of subject invention are possible without departing from the spirit of my invention or the scope of the appended claims.

What is claimed is:

1. In a machine for cutting a sheet of rubber material into a plurality of threads, a rotary shaft, a plurality of spaced cutting discs mounted as a group upon said shaft and rotatable therewith, elastic bushings clamping said discs mounted upon said shaft on opposite sides of said group of discs, a second shaft extending parallel to the first shaft, another plurality of spaced cutting discs mounted upon the second shaft and rotatable therewith, elastic washers mounted upon the second shaft on opposite sides of said other plurality of discs, the discs of one shaft penetrating intermediate the discs of the other shaft, means connected with one of said shafts for adjusting the distance between the shafts, abrasive means having continuous surfaces, means reciprocating said abrasive means in the direction of said shafts while maintaining the continuous surfaces of said abrasive means in contact with the peripheral edges of the discs mounted upon the two shafts, and means connected with the two shafts for rotating the same.

2. In a machine for cutting a sheet of rubber material into a plurality of threads, a rotary shaft, a plurality of cutting discs mounted as a group upon said shaft and rotatable therewith, spacers between said discs, elastic bushings clamping said discs and spacers mounted upon said shaft on opposite sides of said group of discs, a second shaft extending parallel to the first shaft, another plurality of cutting discs mounted upon the second shaft and rotatable therewith, spacers between the second-mentioned discs, elastic washers mounted upon the second shaft on opposite sides of said other plurality of discs, the discs of one shaft penetrating intermediate the discs of the other shaft, means connected with one of said shafts for adjusting the distance between the shafts, an abrasive plate engaging the peripheral edges of the first-mentioned plurality of discs, another abrasive plate engaging the peripheral edges of said other plurality of discs, means reciprocating said abrasive plates in the direction of said shafts while maintaining said abrasive plates in contact with said peripheral edges, and means connected with the two shafts for rotating the same.

3. In a machine for cutting a sheet of rubber material into a plurality of threads, a rotary shaft, an aggregate of spaced cutting discs mounted upon said shaft and rotatable therewith, elastic bushings mounted upon said shaft on opposite sides of said aggregate of discs to clampingly hold same, a second shaft extending parallel to the first shaft, a second aggregate of spaced cutting discs mounted upon the second shaft and rotatable therewith, elastic washers mounted upon the second shaft on opposite sides of said second aggregate of discs, the discs of one shaft penetrating intermediate the discs of the other shaft, each of the discs having a circumferential groove formed in the peripheral edge thereof, an abrasive plate engaging the peripheral edges of the first-mentioned discs, another abrasive plate engaging the peripheral edges of the second-mentioned discs, means reciprocating said abrasive plates in the direction of said shafts while maintaining said abrasive plates in contact with said peripheral edges, wedge members pressing into the circumferential grooves of the discs, and means connected with the two shafts for rotating the same.

References Cited in the file of this patent

UNITED STATES PATENTS

| | | |
|---|---|---|
| 28,345 | Brown | May 22, 1860 |
| 476,938 | Whitney | June 14, 1892 |
| 815,491 | Tschantz | Mar. 20, 1906 |
| 1,143,187 | Green | June 15, 1915 |
| 1,994,137 | Leguillon | Mar. 12, 1935 |
| 2,020,136 | Crocella | Nov. 5, 1935 |
| 2,057,879 | Campbell | Oct. 20, 1936 |